United States Patent [19]

Steinmetz et al.

[11] Patent Number: 5,485,624
[45] Date of Patent: Jan. 16, 1996

[54] CO-PROCESSOR MONITORING ADDRESS GENERATED BY HOST PROCESSOR TO OBTAIN DMA PARAMETERS IN THE UNUSED PORTION OF INSTRUCTIONS

[75] Inventors: Joe H. Steinmetz, Rocklin; Eric G. Tausheck, Citrus Heights, both of Calif.

[73] Assignee: Hewlett-Packard Company, Palo Alto, Calif.

[21] Appl. No.: 269,970

[22] Filed: Jul. 1, 1994

Related U.S. Application Data

[63] Continuation of Ser. No. 717,448, Jun. 19, 1991, abandoned.
[51] Int. Cl.$^6$ ................................................. G06F 15/163
[52] U.S. Cl. ................. 395/775; 364/132; 364/228.6; 364/242.3; 364/DIG. 1; 395/800; 395/200.05; 395/842
[58] Field of Search .................................... 395/725, 800, 395/275, 425, 775; 364/132

[56] References Cited

U.S. PATENT DOCUMENTS

| | | | |
|---|---|---|---|
| 4,371,932 | 2/1983 | Dinwiddie, Jr. et al. | 395/275 |
| 4,672,570 | 6/1987 | Benken | 395/200 |
| 4,866,665 | 9/1989 | Haswell-Smith | 395/575 |
| 5,021,991 | 6/1991 | MacGregor et al. | 395/650 |
| 5,109,333 | 4/1992 | Kubota et al. | 395/275 |
| 5,165,027 | 11/1992 | Krauskopf | 395/400 |
| 5,280,613 | 1/1994 | Chan et al. | 395/700 |

FOREIGN PATENT DOCUMENTS

0067667A3 12/1982 European Pat. Off.

OTHER PUBLICATIONS

System Bus Adapter for Attaching A General Usage Floating Point Processor, *IBM Technical Disclosure Bulletin*, vol. 30, No. 7, Dec. 1987, pp. 155–157.

G. Hastings, E. Gordon, and R. Blasco, Minimum Chip-Count Number Cruncher Uses Bipolar Co-processor, *IRE WESCON Conference Record*, vol. 25, No. 3/1, Sep. 1981, pp. 1–8.

Ralph McGarity and Michael Cruess, Using Bits in an Opcode to Specify what to Invalidate in a Cache, *Motorola Technical Developments*, vol. 7, Oct. 1987, pp. 6–7.

A. C. Davies and Y. T. Fung, Interfacing a Hardware Multiplier to a General-purpose Microprocessor, *Microprocessors and Microsystems*, vol. 1, No. 7, Oct. 1977, pp. 425–431.

*Primary Examiner*—Ken S. Kim

[57] ABSTRACT

A co-processor works in conjunction with a primary processor which does not natively support co-processing. In a memory which provides instructions for the primary processor, parameters for use by the co-processor are embedded within the instructions. This is done by placing the parameters in fields which are unused by the primary processor. When the primary processor accesses the local memory, the addresses generated by the primary processor are monitored by the co-processor. When the co-processor detects a predetermined combination within an address generated by the primary processor, the co-processor accesses the data sent from the local memory to the primary processor. The co-processor then extracts the parameters embedded within the unused fields of the accessed data.

19 Claims, 6 Drawing Sheets

CO-PROCESSOR MONITORING ADDRESS GENERATED BY HOST PROCESSOR TO OBTAIN DMA PARAMETERS IN THE UNUSED PORTION OF INSTRUCTIONS

This application is a continuation of application Ser. No. 07/717,448, filed Jun. 19, 1991, now abandoned.

BACKGROUND

The present invention concerns the adaptation of a processor which does not natively support co-processing into a co-processing system.

In many processing applications, co-processors are utilized to supplement a primary processor. Co-processors can be of particular advantage when a primary processor is either too special purpose or too general purpose to efficiently perform some tasks required in a processor application.

Generally, in applications in which co-processors are used, the co-processor has a very tightly coupled interface with the primary processor. This interface is preferably at the level of the hardware cycle of the primary processor and the co-processor. The tight coupling of such an interface makes for very efficient co-operation between the processors. Alternately, the primary processor can be more loosely coupled to the co-processor using, for example, processor interrupts or polling sequences to synchronize the operation of the co-processor with the primary processor.

While co-processing can be advantageous in many circumstances, unfortunately, not all primary processors natively support co-processing. For example, a 53C710 SCSI I/O processor available from NCR Corporation, having a business address at 1635 Aeroplaza Dr., Colorado Springs, Colo. 80916, may be used in an input/output (I/O) device which interfaces an Extended Industry Standard Architecture (EISA) I/O bus to a SCSI port. The EISA Specification is available from BCPR Services, Inc. which has a business address of 1400 L Street NW., Washington, D.C. 20005. While the NCR 53C710 SCSI I/O processor is adapted to interface with information communicated over a SCSI port, it does not natively support a co-processor. Nevertheless such a co-processor is desirable in order to efficiently perform direct memory access (DMA) transactions using master bus transactions over an EISA I/O bus.

SUMMARY OF THE INVENTION

In accordance with the preferred embodiment of the present invention, a method is presented by which a co-processor may work in conjunction with a primary processor which does not natively support co-processing. In a memory which provides instructions for the primary processor, parameters for use by the co-processor are embedded within the instructions. This is done by placing the parameters in fields which are unused by the primary processor, for example, in the unused fields of NOP instructions. When the primary processor accesses the memory, the addresses generated by the primary processor are monitored by the co-processor. When the co-processor detects a pre-determined combination within an address generated by the primary processor, the co-processor accesses the data sent from the memory to the primary processor. The co-processor then extracts the parameters embedded within the unused fields of the accessed data. Different pre-determined combinations of addresses generated by the processor may be used to indicate different sequences of parameters and/or different locations of unused fields within an instruction being used to store the parameters.

In the preferred embodiment of the present invention, the primary processor is directed to assert unused address lines to indicate when parameters will be passed to the co-processor. The co-processor monitors these unused address lines. After they are asserted, the co-processor can extract the embedded parameters and load them into registers used to describe and control the DMA transfer.

The present invention can be of particular interest on an interface card where the primary processor is focussed on communicating with a data port on the front plane of the interface card. The co-processor, by intercepting parameters for a DMA transfer, can set-up and then perform DMA transactions over an I/O bus in a manner which is transparent to the primary processor.

DESCRIPTION OF THE PREFERRED EMBODIMENT

Figure 1:
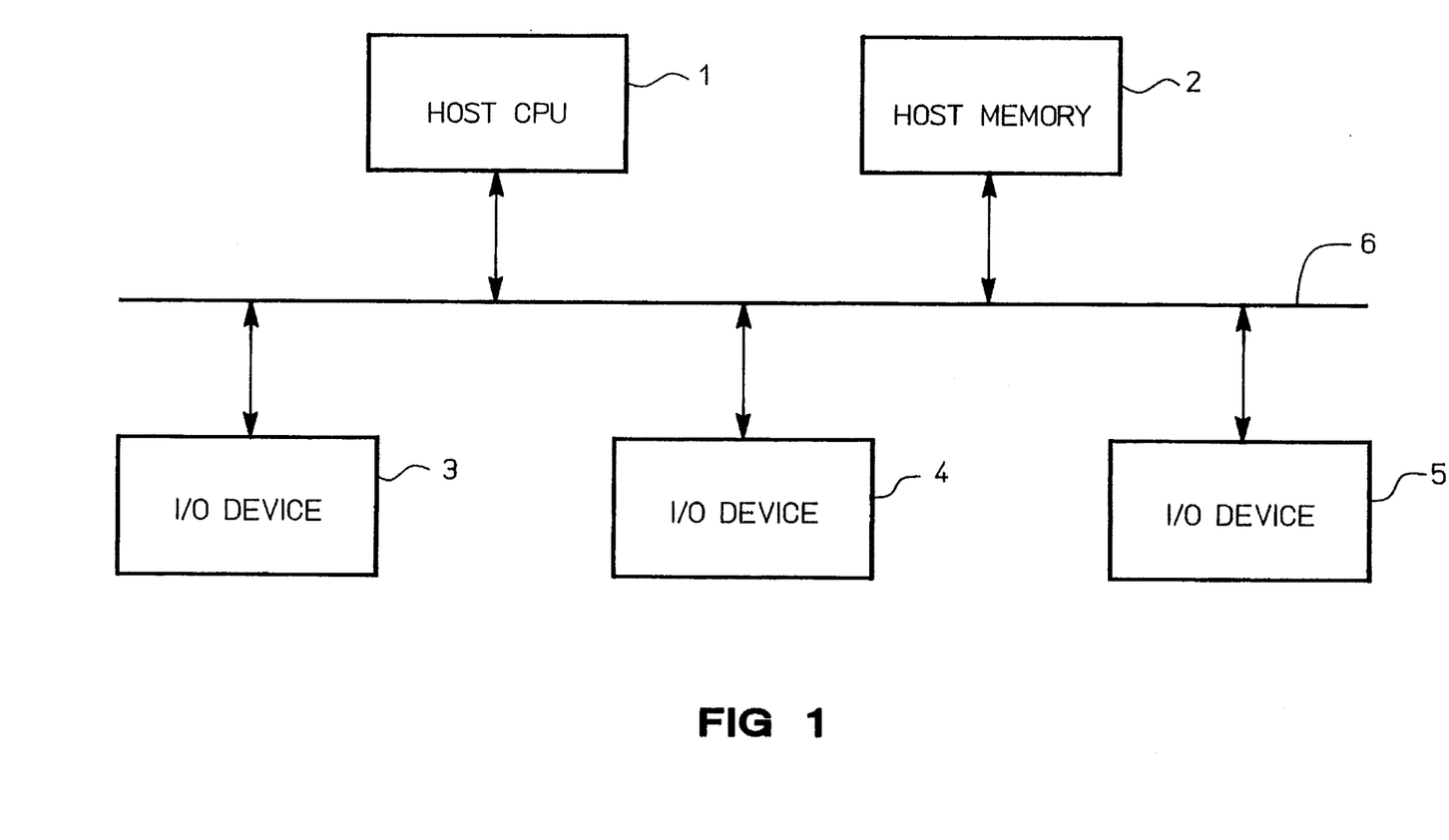
FIG. 1 shows a host central processing unit (CPU), a host memory and several input/output (I/O) devices connected to an I/O bus.

FIG. 1 shows a block diagram of an input/output (I/O) system in which a host CPU 1, a host memory 2, an I/O device 3, an I/O device 4 and an I/O device 5 are connected to an I/O bus 6. Host CPU 1 and host memory 2 may be, for example, part of a personal computer system such as those available from Hewlett-Packard Company having a business address of 3000 Hanover St., Palo Alto, Calif. 94304. I/O bus operates, for example, in accordance with EISA. I/O device 3, I/O device 4 and I/O device 5, for example, are interface cards which interact with a host computer which includes host CPU 1 and host memory 2.

Figure 2:
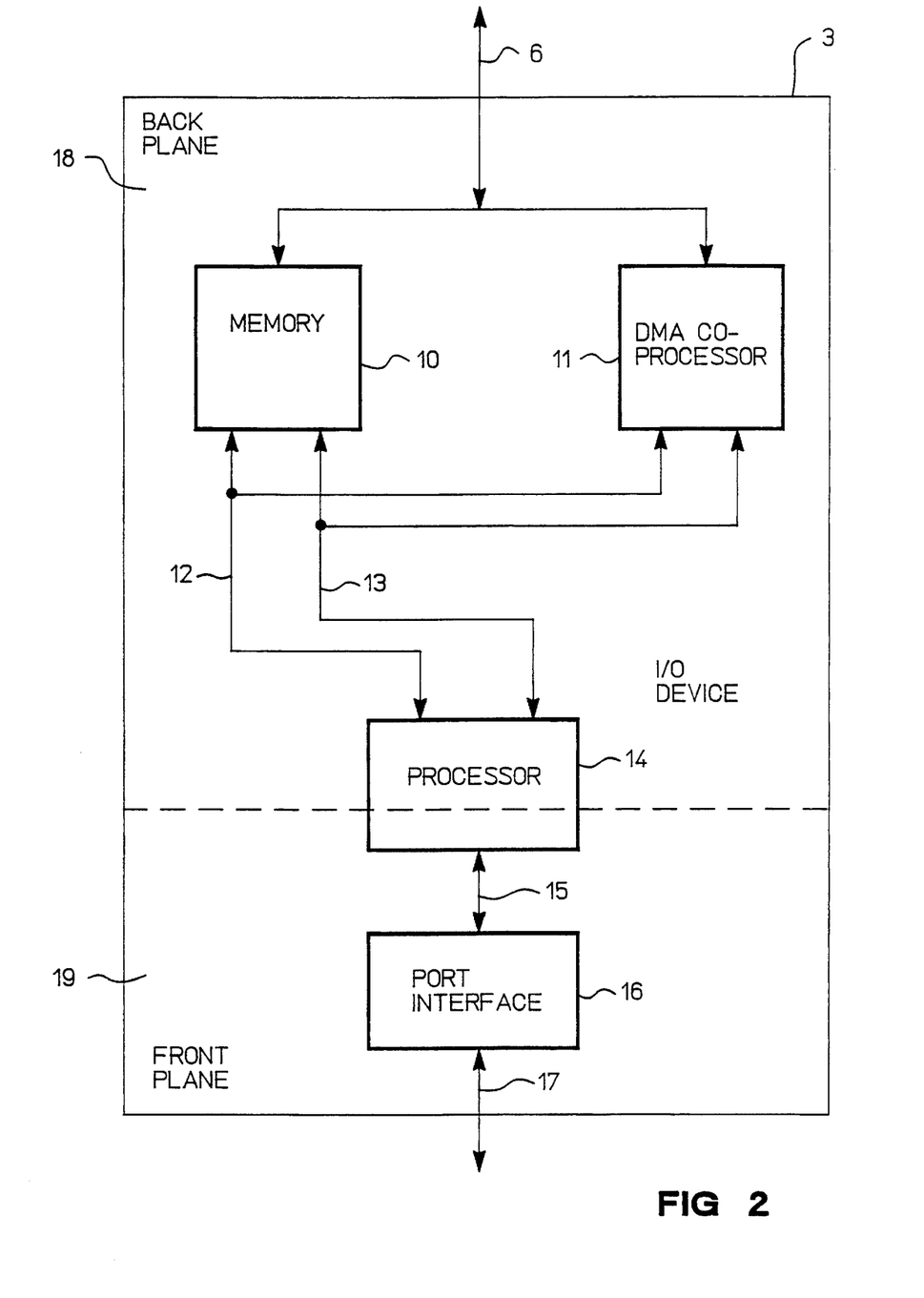
FIG. 2 shows a block diagram of an I/O device in accordance with the preferred embodiment of the present invention.

FIG. 2 shows a block diagram of I/O device 3. In a front plane 19 of I/O device 3, processor 14, through a port interface 16, communicates with a SCSI port 17. Processor 14 is, for example, a 53C710 SCSI I/O processor available from NCR Corporation. In a back plane 18, a local memory 10 stores both data and command scripts. The command scripts are used by processor 14 as processing instructions. Processor 14 controls data flow between local memory 10 and SCSI port 17 through port interface 16. Processor 14 communicates with local memory 10 using a data bus 12 and an address bus 13.

A DMA co-processor 11 is used to set-up DMA transfers between local memory 10 and EISA bus 6. Since processor 14 does not natively support co-processing, DMA co-processor "snoops" in on addresses and data transferred from local memory 10 to processor 14. For example, address bus contains thirty-two address lines which may be referred to as A0 through A31. However, local memory 10 generally only requires sixteen bits for each address. Therefore, address lines A16 through A31 are unused by processor 14 when accessing local memory 10. In the preferred embodiment of the present invention, three of these unused address lines, address lines A17 through A19, are used to signal DMA co-processor to begin a specified sequence to gather in parameters for a DMA transfer. These parameters are embedded in unused fields of instructions, for example unused fields in NOP instructions, which are being passed from local memory 10 to processor 14 on data bus 12. Asserting different combinations of address lines A17 through A19 indicates different sequences of parameters to be extracted from instructions. Also, asserting different combinations of address lines A17 through A19 can indicate different locations of unused fields within instructions in which parameters are stored.

Figure 3:
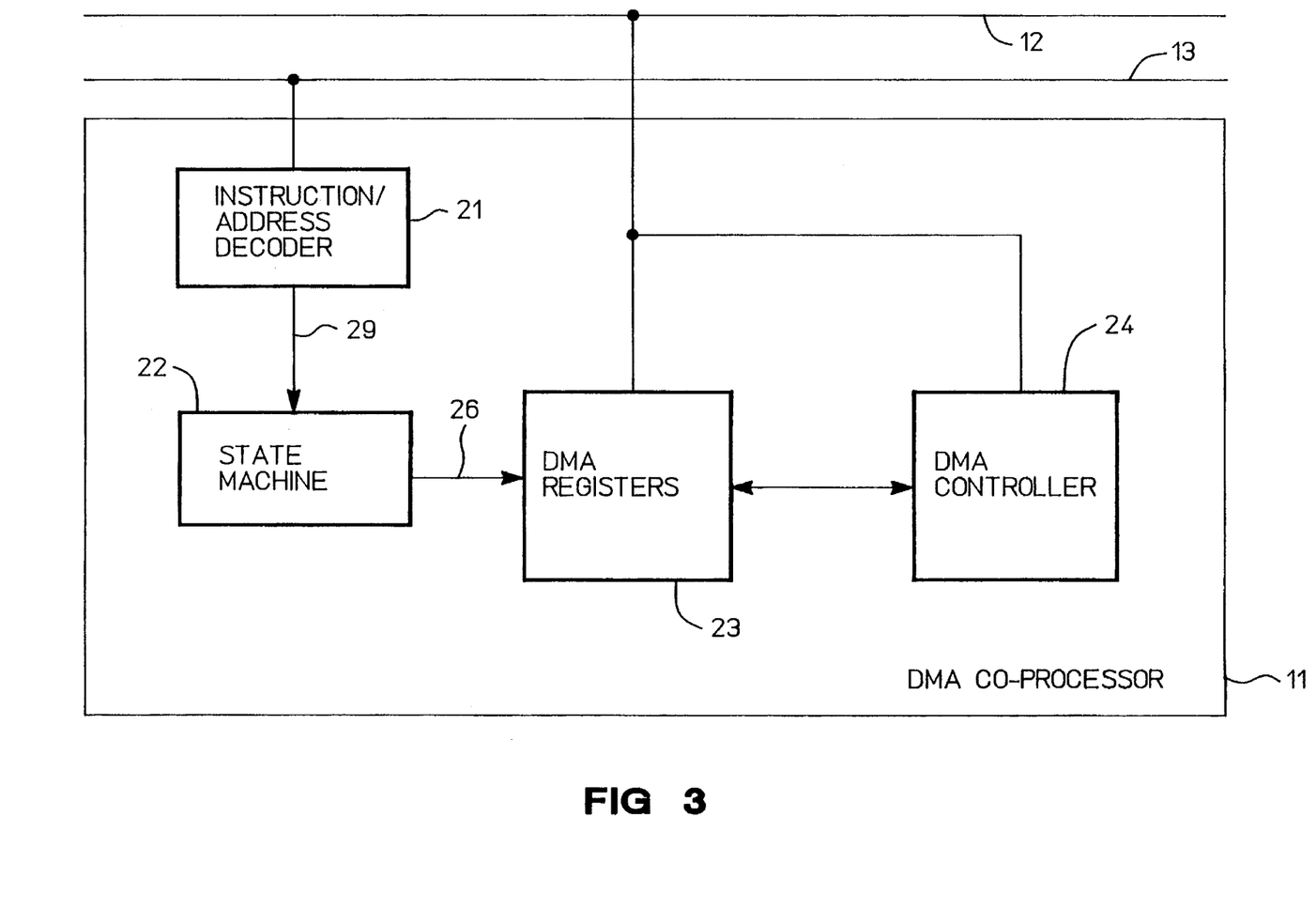
FIG. 3 shows a block diagram of a DMA co-processor in accordance with the preferred embodiment of the present invention.

FIG. 3 shows a block diagram of DMA co-processor 11. An instruction address decoder 21 decodes values on address lines A17 through A19 of address bus 13 and produces control signals 29 which are used by a state machine 22. From control signals 29, state machine 22 generates control signals 26. Control signals 26 are used to select a register from DMA registers 23 to receive data snooped from data bus 12. The snooped data is from unused fields of data being transferred from instructions being sent from local memory 10 to processor 14. In response to a particular combination of control signals 26 being asserted, a value on data bus 12 is loaded into the selected DMA register 23. Once a DMA transaction has been set up by values loaded into DMA registers 23, a DMA controller 24 oversees a DMA transfer between local memory 10 and bus 6. The DMA transfer is done completely independent of processor 14.

Figure 4:
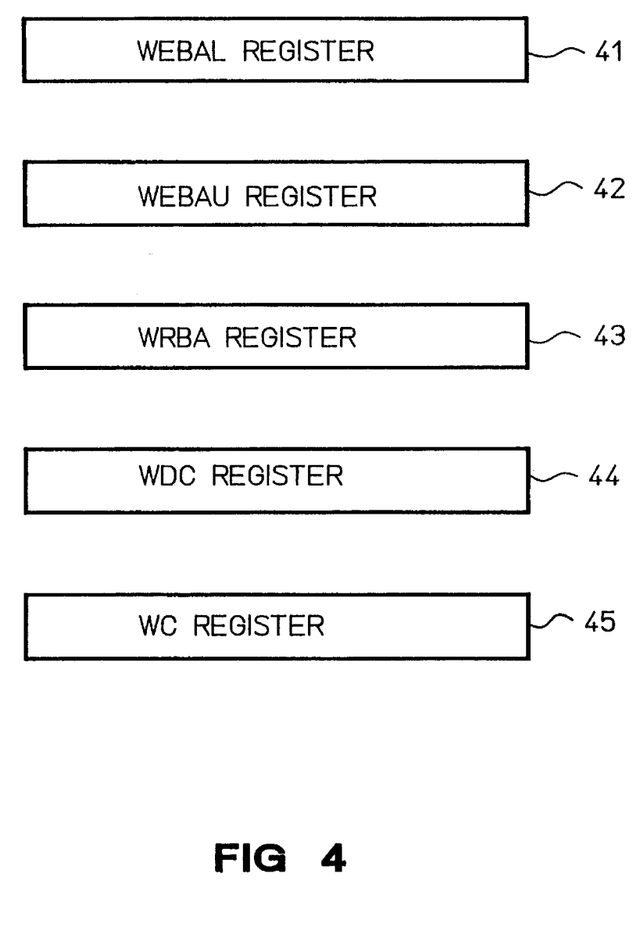
FIG. 4 shows registers within the DMA co-processor shown in FIG. 3 in accordance with the preferred embodiment of the present invention.

FIG. 4 shows registers within DMA registers 23. A write EISA base address lower (WEBAL) register 41 is used to store the low order sixteen bits of an address within host memory 2. A write EISA base address upper (WEBAU) register 42 is used to store a high order sixteen bits of the address within host memory 2. Together WEBAL and WEBAU give a host address within host memory 2. For a DMA write transaction in which data flows from host memory 2 to I/O device 3, the host address is the start address for the data to be sent. For a DMA read transaction in which data flows from I/O device 3 to host memory 2, the host address is the address of the first word into which data is transferred.

A write RAM base address (WRBA) register 43 is used to store an address within local memory 10. For a DMA write transaction in which data flows from host memory 2 to I/O device 3, WRBA is the address of the first word into which data is transferred. For a DMA read transaction in which data flows from I/O device 3 to host memory 2, WRBA is the start address for the data to be sent. A write DMA count (WDC) register 44 is used to store a word count for the DMA transfer. A write control (WC) register 45 is used as a control register for DMA controller 24. Once a start bit and a lock-out bit within WC register 45 is set, DMA controller 24 locks out processor 14 from using data bus 12 and oversees a DMA transfer over bus 6 in accordance with EISA specifications.

Figure 5:
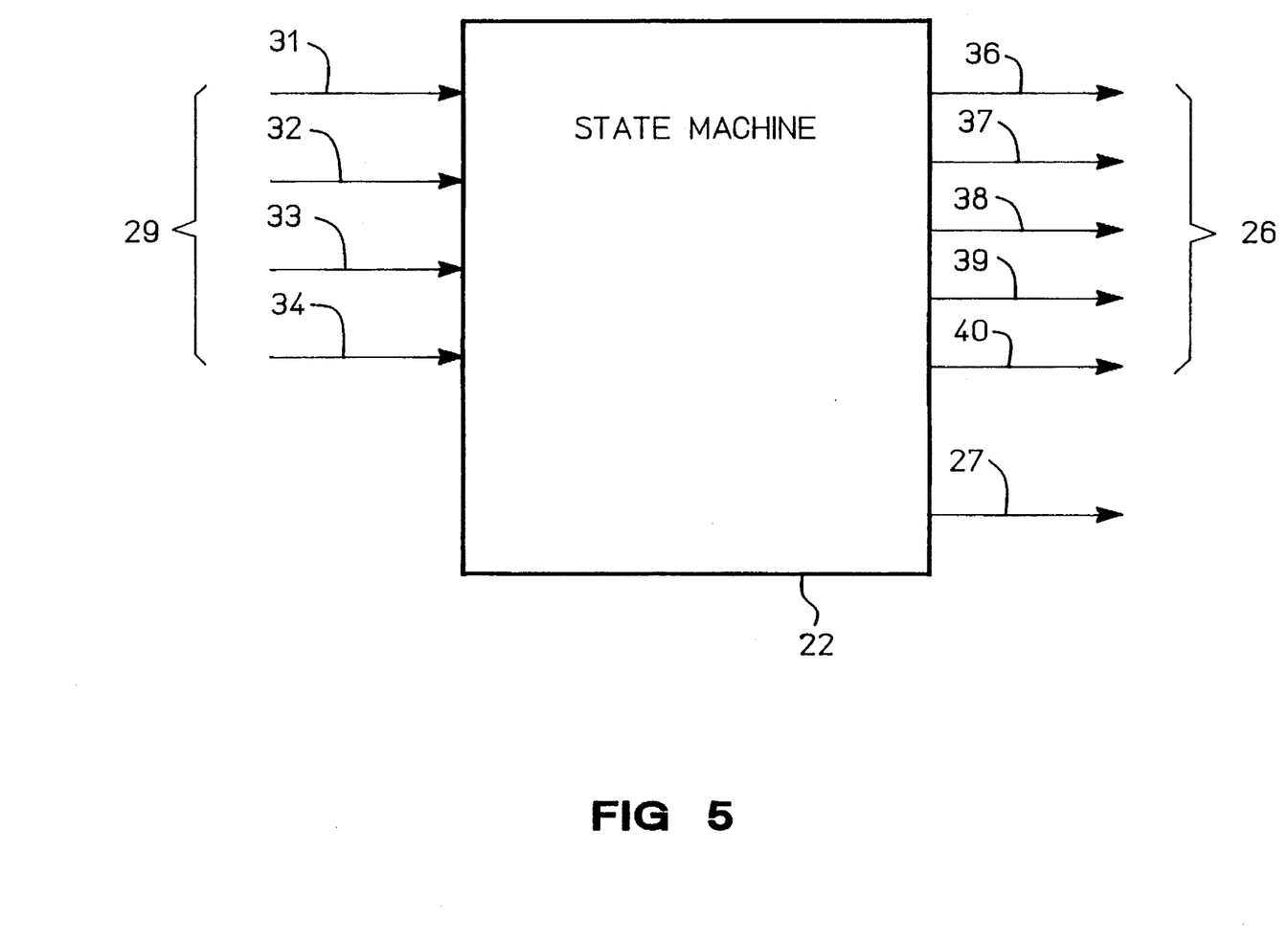
FIG. 5 shows a block diagram of a state machine within the DMA co-processor shown in FIG. 3, in accordance with the preferred embodiment of the present invention.

FIG. 5 shows inputs to and outputs from state machine 22. Control signals 29 are shown to include a snoop1 input 31, a snoop2 input 32, a snoop3 input 33 and a qualifying control parameter (STERM) input 34. Snoop1 input 31 is asserted when values are to be loaded into all of WEBAL register 41, WEBAU register 42, WRBA register 43, WDC register 44 and WC register 45. Snoop2 input 32 is asserted when values are to be loaded into WRBA register 43, WDC register 44 and WC register 45. Snoop3 input 33 is asserted when values are to be loaded into only WC register 45.

STERM input 34 is asserted after address line A19 is asserted. Instruction/address decoder 21 asserts snoop1 input 31 when address line A19 is asserted, address line A17 is asserted and address line A18 is not asserted. Instruction/address decoder 21 asserts snoop2 input 32 when address line A19 is asserted, address line A17 is not asserted and address line A18 is asserted. Instruction/address decoder 21 asserts snoop3 input 33 when address line A19 is asserted, address line A17 is asserted and address line A18 is asserted. As seen in FIG. 5, Control signals 26 include a WEBAL signal 36, a WEBAU signal 37, a WRBA signal 38, a WDC signal 39 and a WC signal 40.

Figure 6:
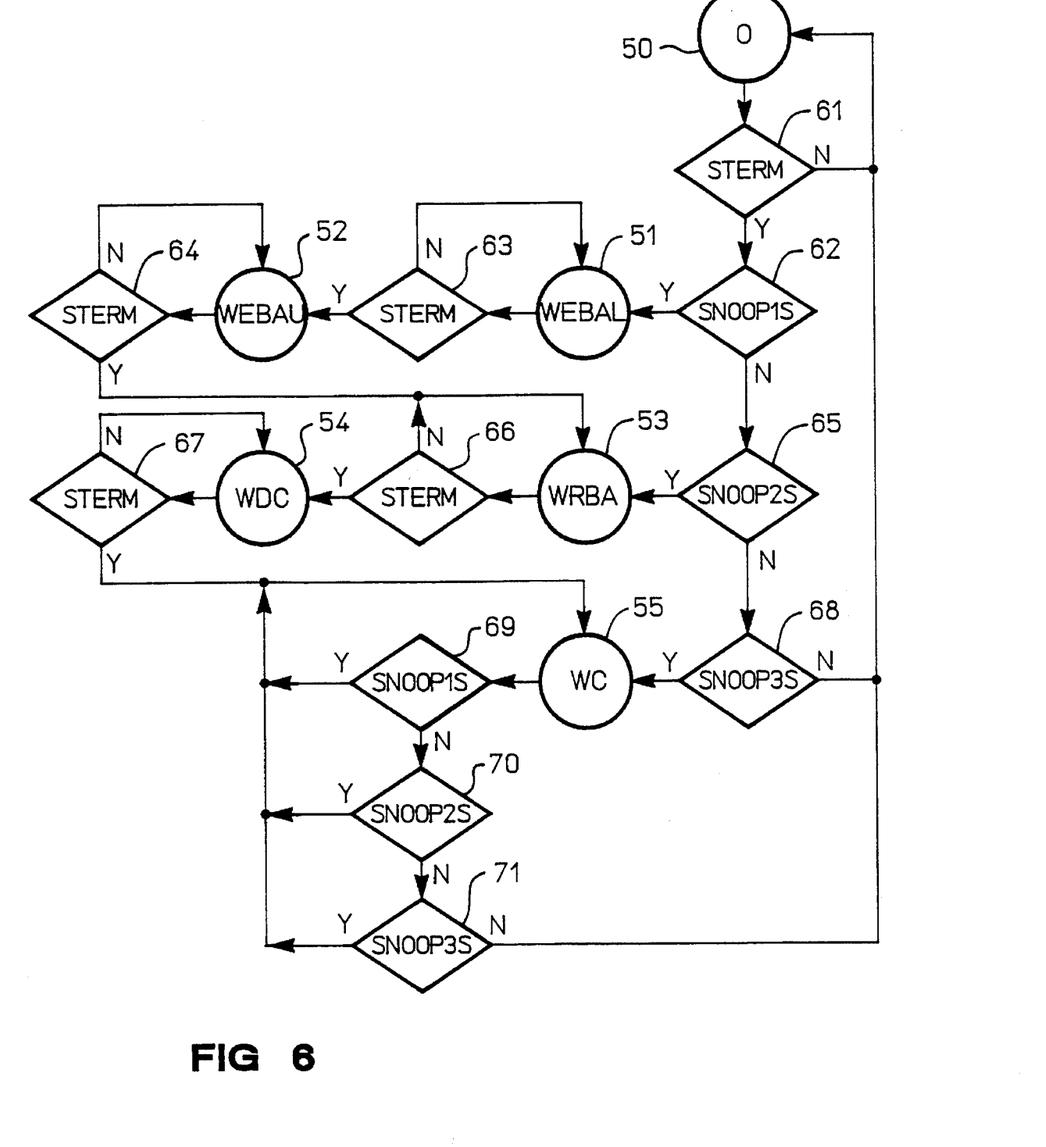
FIG. 6 shows a state diagram for the state machine shown in FIG. 5 in accordance with the preferred embodiment of the present invention.

FIG. 6 shows a state diagram for state machine 22. In a initial state 50, no outputs of state machine 22 are asserted. From initial state 50, state machine 22 can move into one of three new states or remain in initial state 50. When an address is placed on address lines 13, eventually STERM input 34 will be asserted (represented by an event diamond 61) and snoop1 input 31 will be asserted (represented by an event diamond 62). Then, a WEBAL state 51 is entered. When STERM input 34 is asserted, snoop1 input 31 is not asserted and snoop2 input 32 is asserted (represented by an event diamond 65) a WRBA state 53 is entered. When STERM input 34 is asserted, snoop1 input 31 is not asserted, snoop2 input 32 is not asserted and snoop3 input 33 is asserted (represented by an event diamond 65), a WC state 55 is entered. Otherwise state machine 22 remains in initial state 50.

In WEBAL state 51, state machine 22 asserts WEBAL signal 36. This causes DMA registers 23 to load the low order 16 bits of a data word on data lines 12 into WEBAL register 41. From WEBAL state 51, state machine 22 moves into a WEBAU state 52 when a new address is placed on address lines 13 resulting in STERM input 34 being asserted (represented by an event diamond 63).

In WEBAU state 52, state machine 22 asserts WEBAU signal 37. This causes DMA registers 23 to load the low order 16 bits of a data word on data lines 12 into WEBAU register 42. From WEBAU state 52, state machine 22 moves into WRBA state 53 when a new address is placed on address lines 13 resulting in STERM input 34 being asserted (represented by an event diamond 64).

In WRBA state 53, state machine 22 asserts WRBA signal 38. This causes DMA registers 23 to load the low order 16 bits of a data word on data lines 12 into WRBA register 43. From WRBA state 53, state machine 22 moves into a WDC state 54 when a new address is placed on address lines 13 resulting in STERM input 34 being asserted (represented by an event diamond 66).

In WDC state 54, state machine 22 asserts WDC signal 39. This causes DMA registers 23 to load the low order 16 bits of a data word on data lines 12 into WDC register 44. From WDC state 54, state machine 22 moves into WC state 55 when a new address is placed on address lines 13 resulting in STERM input 34 being asserted (represented by an event diamond 67).

In WC state 55, state machine 22 asserts WC signal 40. This causes DMA registers 23 to load the low order 16 bits of a data word on data lines 12 into WC register 45. State machine 22 remains in WC state 55 as long as snoop1 input 31 remains asserted (represented by an event diamond 69), snoop2 input 32 remains asserted (represented by an event diamond 70), or snoop3 input 33 remains asserted (represented by an event diamond 71). Otherwise, state machine 22 returns to initial state 50.

A sample program shown in Table 1 sets up and starts a DMA transfer. The program is stored as a script of instructions in local memory 10. As processor 14 reads the script using address lines 13 and data lines 12, DMA co-processor 11 snoops unused values on address lines 13 and data lines 12 to set up the DMA transfer. A single address on address lines 13 is used to access two thirty-two bit words from memory 14. For the purpose of the snooping done by DMA co-processor 11, access of each of the two thirty-two bit words is a separate access on data lines 12 and address lines 13. The numbers within Table 1 are in hexadecimal.

TABLE 1

| Double Word Address | First Data Word | | Second Data Word | |
|---|---|---|---|---|
| | 16 bit | 16 bit | 16 bit | 16 bit |
| 0000 0100 | CALL | xxxx | 000A | 0400 |
| 0000 0108 | | | | |
| * | * | * | * | * |
| * | * | * | * | * |
| 0000 0400 | NOP | 1230 | xxxx | 00EE |
| 0000 0408 | NOP | 03C0 | xxxx | 0200 |
| 0000 0410 | RETURN | 4001 | xxxx | xxxx |

As shown in Table 1, memory location 0000 0100 in local memory 10 contains an instruction for processor 14. When processor 14 asserts this address, processor 14 receives two thirty-two bit data words over data lines 12. The first sixteen bits of the first thirty-two bit data words contains an operation code which indicates that a macro is being called. The second thirty-two bit data word (000A 0400) indicates the address of the first instruction of the macro. Processor 14 then jumps to this address to continue executing the script.

Processor 14, places the received address (000A 0400) on address lines 13. Since only the low order sixteen bits of address lines 13 are used by local memory 10, the actual address accessed is (0000 0400). However, instruction/address decoder 21 within DMA co-processor 11 detects that address line A17 is asserted and address line A19 is asserted. Instruction/address decoder 21, therefore, asserts snoop1 input 31 and STERM input 34. Processor 14 decodes the operation code on the first sixteen bits of the first data word as a no operation (NOP) instruction. Processor 14, therefore, ignores the remainder of the first data word and the second data word. DMA co-processor 11, however, places the low order sixteen bits of data in the first data word (1230) into WEBAL register 41, and places the low order sixteen bits of data in the second data word (00EE) into WEBAU register 42.

After receiving the two data words at address (0000 0400), processor 14 increments its program counter to (000A 0408). Processor 14, places the new address (000A 0408) on address lines 13. Since only the low order sixteen bits of address lines 13 are used by local memory 10, the actual address accessed within local memory 10 is (0000 0408). Instruction/address decoder 21 within DMA co-processor 11 again detects that address line A17 is asserted and address line A19 is asserted. Instruction/address decoder 21, therefore, asserts snoop1 input 31 and STERM input 34. Processor 14 decodes the operation code on the first sixteen bits of the first data word as a NOP. Processor 14, therefore, ignores the remainder of the first data word and the second data word. DMA co-processor 11, however, places the low order sixteen bits of data in the first data word (03C0) into WRBA register 43, and places the low order sixteen bits of data in the second data word (0200) into WDC register 44.

After receiving the two data words at address (0000 0408), processor 14 again increments its program counter to (000A 0410). Processor 14, places the new address (000A 0410) on address lines 13. Since only the low order sixteen bits of address lines 13 are used by local memory 10, the actual address accessed within local memory 10 is (0000 0410). Instruction/address decoder 21 within DMA co-processor 11 again detects that address line A17 is asserted and address line A19 is asserted. Instruction/address decoder 21, therefore, asserts snoop1 input 31 and STERM input 34. Processor 14 decodes the operation code on the first sixteen bits of the first data word as a RETURN. Processor 14, therefore, ignores the remainder of the first data word and the second data word. DMA co-processor 11, however, places the low order sixteen bits of data in the first data word (4001) into WC register 45. The set bits tell DMA controller 24, to lock out processor 14 from using address lines 13 and data lines 12, and to perform the DMA transaction that has been indicated by the values loaded into DMA registers 23. DMA controller 24 then completes the DMA transaction. Upon completion of the DMA transaction, DMA controller releases address lines 13 and data lines 12 so they may be accessed again by processor 14.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for obtaining parameters for a co-processor from data accessed by a primary processor from a local memory, the method comprising the steps of:
   (a) monitoring, by the co-processor, of addresses generated by the primary processor, the addresses being for accessing memory locations within the local memory;
   (b) upon detecting a pre-determined bit pattern within an address generated by the primary processor, accessing, by the co-processor, a parameter within a portion of data addressed by the primary processor, the portion of the data being unused by the primary processor, the co-processor accessing the data as the data is transferred from the local memory to the primary processor, wherein the co-processor is used to perform DMA between an interface card and a host computer, the parameters describe a DMA transaction and the parameters are loaded by the co-processor into DMA registers, the primary processor, the co-processor and the local memory all residing within the interface card.

2. A method as in claim 1 wherein the predetermined bit pattern is an assertion of at least one memory address line not needed to address data within the local memory.

3. A method as in claim 1 wherein, in step (b), the data addressed by the address is an instruction for execution by the primary processor and wherein the portion of the instruction being unused by the primary processor is an unused field of the instruction.

4. A method as in claim 3 wherein the instruction is a no operation instruction.

5. A method as in claim 1 wherein different predetermined bit patterns within an address indicate different locations of parameters in unused fields of an instruction.

6. A method for obtaining parameters for a co-processor from data accessed by a primary processor from a local memory, the method comprising the steps of:
- (a) monitoring, by the co-processor, of addresses generated by the primary processor, the addresses being for accessing memory locations within the local memory;
- (b) upon detecting a pre-determined bit pattern within an address generated by the primary processor, accessing, by the co-processor, a parameter within a portion of an instruction addressed by the primary processor, the portion of the instruction being unused by the primary processor, wherein the co-processor is used to perform DMA between an interface card and a host computer, the parameters describe a DMA transaction and the parameters are loaded by the co-processor into DMA registers, the primary processor, the co-processor and the local memory all residing within the interface card and wherein different predetermined bit patterns within an address indicate different sequences of the parameters, the parameters being embedded in information sent from the local memory to the primary processor.

7. A co-processor which obtains parameters which describe a DMA transaction from data accessed by a primary processor from a local memory, the co-processor comprising:

monitoring means for monitoring addresses generated by the primary processor, the addresses being generated by the primary processor for accessing data within the local memory; and, accessing means, coupled to the monitoring means, for, upon the monitoring means detecting a pre-determined bit pattern within an address generated by the primary processor, accessing a parameter within a portion of the data accessed by the primary processor from the local memory, the portion of the data being unused by the primary processor, the accessing means accessing the data as the data is transferred from the local memory to the primary processor, wherein the accessed parameter is loaded by the co-processor into a DMA register.

8. A co-processor as in claim 7 wherein the pre-determined bit pattern is an assertion of at least one memory address line not needed to address data within the local memory.

9. A co-processor as in claim 7 wherein the data addressed by the address is an instruction for execution by the primary processor and wherein the portion of the instruction being unused by the primary processor is an unused field of the instruction.

10. A co-processor as in claim 10 wherein the instruction is a no operation instruction.

11. A co-processor as in claim 7 wherein different predetermined bit patterns within an address indicate different sequences of parameters within the data accessed by the primary processor from the local memory.

12. A co-processor as in claim 7 wherein different predetermined bit patterns within an address indicate different locations of parameters in unused fields of an instruction.

13. A co-processor which obtains parameters from data accessed by a primary processor from a local memory, the co-processor comprising:

monitoring means for monitoring addresses generated by the primary processor the addresses being generated by the primary processor for accessing data within the local memory;

accessing means, coupled to the monitoring means, for, upon the monitoring means detecting a pre-determined bit pattern within an address generated by the primary processor, accessing a parameter within a portion of the data accessed by the primary processor from the local memory, the portion of the data being unused by the primary processor; and, a DMA controller which oversees DMA transactions between the local memory and a host computer, wherein the parameters describe a DMA transaction to be performed by the DMA controller.

14. A co-processor as in claim 13 wherein the monitoring means comprises an instruction/address decoder.

15. A co-processor as in claim 14 wherein the accessing means comprises:

a state machine, coupled to the instruction/address decoder, the state machine receiving inputs from the instruction/address decoder; and, DMA registers, coupled to the DMA controller and to the state machine, wherein the state machine generates control signals for the loading of the parameters into the DMA registers.

16. In an interface card which interacts with a host memory through an I/O bus, a method for obtaining, by a DMA co-processor, parameters for a DMA transfer over the I/O bus, the method comprising the steps of:

- (a) storing, in a local memory within the interface card, scripts which contain instructions to be executed by a primary processor within the interface card, parameters for the DMA transfer being embedded within fields in the instructions, the fields being unused by the primary processor;
- (b) in response to addresses generated by the primary processor, forwarding the instructions from the local memory to the primary processor;
- (c) monitoring, by the DMA co-processor, the addresses generated by the primary processor;
- (d) upon detecting a pre-determined bit pattern within an address generated by the primary processor, accessing, by the co-processor, the parameters embedded within the unused fields of the instructions as the instructions are forwarded from the local memory to the primary processor.

17. A method as in claim 16 wherein in step (d) the predetermined bit pattern is an assertion of at least one memory address line not needed to address data within the local memory.

18. A method as in claim 17 wherein the instructions include a no operation instruction.

19. A method as in claim 16 wherein different predetermined bit patterns within an address indicate different sequences of parameters within the instructions.

* * * * *